(12) United States Patent
Ortega Sabogal

(10) Patent No.: US 11,007,446 B2
(45) Date of Patent: May 18, 2021

(54) USER COMMUNICATION

(71) Applicant: KING.COM LIMITED, St. Julians (MT)

(72) Inventor: Andres Ortega Sabogal, Barcelona (ES)

(73) Assignee: KING.COM LTD., St. Julians (MT)

( * ) Notice: Subject to any disclaimer, the term of this patent is extended or adjusted under 35 U.S.C. 154(b) by 17 days.

(21) Appl. No.: 16/665,250

(22) Filed: Oct. 28, 2019

(65) Prior Publication Data

US 2020/0054951 A1 Feb. 20, 2020

Related U.S. Application Data

(63) Continuation of application No. 14/722,523, filed on May 27, 2015, now Pat. No. 10,456,691.

(51) Int. Cl.
*A63F 13/87* (2014.01)
*A63F 13/79* (2014.01)

(52) U.S. Cl.
CPC .............. *A63F 13/87* (2014.09); *A63F 13/79* (2014.09)

(58) Field of Classification Search
CPC .................................. A63F 13/87; A63F 13/79
See application file for complete search history.

(56) References Cited

U.S. PATENT DOCUMENTS

| 2010/0203963 A1* | 8/2010 | Allen | G07F 17/3218 463/30 |
| 2011/0201414 A1 | 8/2011 | Barclay et al. | |
| 2012/0184362 A1 | 7/2012 | Barclay et al. | |
| 2013/0331162 A1* | 12/2013 | Krivicich | A63F 13/426 463/10 |
| 2014/0006517 A1 | 1/2014 | Hsiao et al. | |

* cited by examiner

*Primary Examiner* — James S. McClellan
*Assistant Examiner* — Peter J Iannuzzi
(74) *Attorney, Agent, or Firm* — Saul Ewing Arnstein & Lehr LLP

(57) ABSTRACT

A method comprising: storing information relating to one or more game objects; determining game objects to be displayed in a manner enabling a first user to play a game using the objects; causing at least one graphical representation associated with a second user to be displayed on the game board in association with at least one of the game objects, information of the at least one graphical representation being obtained from an electronic database storing information relating to a plurality of user profiles, and at least one game criteria being associated with the at least one graphical representation of the second user; and receiving a user input from the first user in response to the user input determining a match condition between a plurality of game objects, the match condition causing the game criteria to be satisfied; and responsive to satisfying the game criteria, initiating communication with the second user.

20 Claims, 13 Drawing Sheets

USER COMMUNICATION

CROSS-REFERENCE TO RELATED APPLICATIONS

This is a continuation of U.S. application Ser. No. 14/722,523, filed on May 27, 2015, the entire contents of which being fully incorporated herein by reference.

FIELD OF THE INVENTION

Embodiments of this application relate to communication between users in an online environment. Some embodiments may relate to engaging users or players in a computer game executable in an online environment.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object.

This patent specification describes not only various ideas and functions, but also their creative expression. A portion of the disclosure of this patent document therefore contains material to which a claim for copyright is made and notice is hereby given: Copyright King.com Limited 2015 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In a first aspect there is provided a computer-implemented method comprising: storing in a memory information relating to one or more game objects; determining by a processor in communication with the memory one or more of the game objects to be displayed on a game board on a display in a manner enabling a first user to play a game using the one or more game objects; causing by the processor at least one graphical representation associated with a second user to be displayed on the game board in association with at least one of the one or more game objects, information of the at least one graphical representation being obtained from an electronic database storing information relating to a plurality of user profiles, and at least one game criteria being associated with the at least one graphical representation of the second user; and receiving a user input from the first user via a user interface and in response to the user input determining a match condition between a plurality of game objects, the match condition causing the game criteria to be satisfied; and responsive to satisfying the game criteria, initiating communication with the second user.

In a second aspect there is provided a computer readable storage device storing instructions that, when processed by at least one processor of a device, causes said processor to: store in a memory information relating to one or more game objects; determine by the processor in communication with the memory one or more of the game objects to be displayed on a game board on a display in a manner enabling a first user to play a game using the one or more game objects; cause by the processor at least one graphical representation associated with a second user to be displayed on the game board in association with at least one of the one or more game objects, information of the at least one graphical representation being obtained from an electronic database storing information relating to a plurality of user profiles, and at least one game criteria being associated with the at least one graphical representation of the second user; and receive a user input from the first user via a user interface and in response to the user input determining a match condition between a plurality of game objects, the match condition causing the game criteria to be satisfied; and responsive to satisfying the game criteria, initiate communication with the second user.

According to a third aspect there is provided a device comprising: at least one memory; at least one processor in communication with the at least one memory; the at least one memory storing information relating to one or more game objects; the at least one processor configured to determine one or more of the game objects to be displayed on a game board on a display in a manner enabling a first user to play a game using the one or more game objects; cause at least one graphical representation associated with a second user to be displayed on the game board in association with at least one of the one or more game objects, information of the at least one graphical representation being obtained from an electronic database storing information relating to a plurality of user profiles, and at least one game criteria being associated with the at least one graphical representation of the second user; and receive a user input from the first user via a user interface and in response to the user input determine a match condition between a plurality of game objects, the match condition causing the game criteria to be satisfied; and responsive to satisfying the game criteria, initiate communication with the second user.

According to some embodiments, the game criteria comprises releasing a game object with which the graphical representation of a second user is associated from a locked status in the game.

According to some embodiments, the match condition causing the game criteria to be satisfied comprises an nth match condition.

According to some embodiments, the at least one game object associated with the graphical representation associated with the second user is displayed on the game board adjacent the plurality of game objects satisfying the match condition.

According to some embodiments, the game criteria comprises a match condition comprising at least one game object with the graphical representation associated with the second user.

According to some embodiments, the at least one game object associated with the graphical representation associated with the second user is at least one of the game objects satisfying the match condition.

According to some embodiments, the match condition indirectly causes the game criteria to be satisfied.

According to some embodiments, indirectly causing the game criteria to be satisfied comprises removing at least one of; the at least one game object associated with the graphical representation associated with the second user; and at least one object associated with the at least one game object associated with the graphical representation associated with the second user.

According to some embodiments, indirectly causing the game criteria to be satisfied may be in response to activation of a booster object.

According to some embodiments at least one of the one or more game objects is removed from the game board in response to the match condition.

According to some embodiments, on detecting the match condition, at least three game objects are caused to be removed from the displayed game board and replacement game objects are caused to be displayed on the game board.

According to some embodiments, the received user input from the first user comprises an operation comprising swapping a position of at least two game objects on the game board.

According to some embodiments, the received user input comprises an operation comprising sliding one or more game objects on the game board.

According to some embodiments, the initiating communication comprises transmitting a message to the second user.

According to some embodiments, the message comprises an electronic data message.

According to some embodiments, the message comprises link information, and the second user is enabled to select the link information to view a video of the game.

According to some embodiments, the message is addressed to the second user from the first user.

According to some embodiments, the message comprises an automatically generated message.

According to some embodiments, following the initiating communication with the second user, instant messaging between the first user and the second user is enabled.

According to some embodiments, the causing at least one graphical representation associated with a second user to be displayed comprises selecting the at least one graphical representation based on at least one parameter associated with the second user.

According to some embodiments, the at least one parameter comprises a ranking of the second user.

According to some embodiments, the ranking of the second user is compared with a ranking of the first user.

According to some embodiments, the graphical representation comprises a profile picture of the second user obtained from a social network.

According to some embodiments, the database comprises the social network.

According to some embodiments, the graphical representation comprises an avatar.

BRIEF DESCRIPTION OF DRAWINGS

To understand some embodiments, reference will now be made by way of example only to the accompanying drawings, in which.

DETAILED DESCRIPTION

The techniques described herein may be implemented in for instance a computer implemented game. In some embodiments, the game may be provided with different levels. Each level may have a specific goal or game objective. Each level may have a specific difficulty associated with it. The harder a level, generally the less likely a level is to be completed and/or the greater the required skill of the player.

For example the game may be a "matching" game where a user is required to match a number of game objects on a game board. Alternatively the game may be a role-playing game (RPG), where users assume the roles of characters in a fictional setting.

Figure 1:
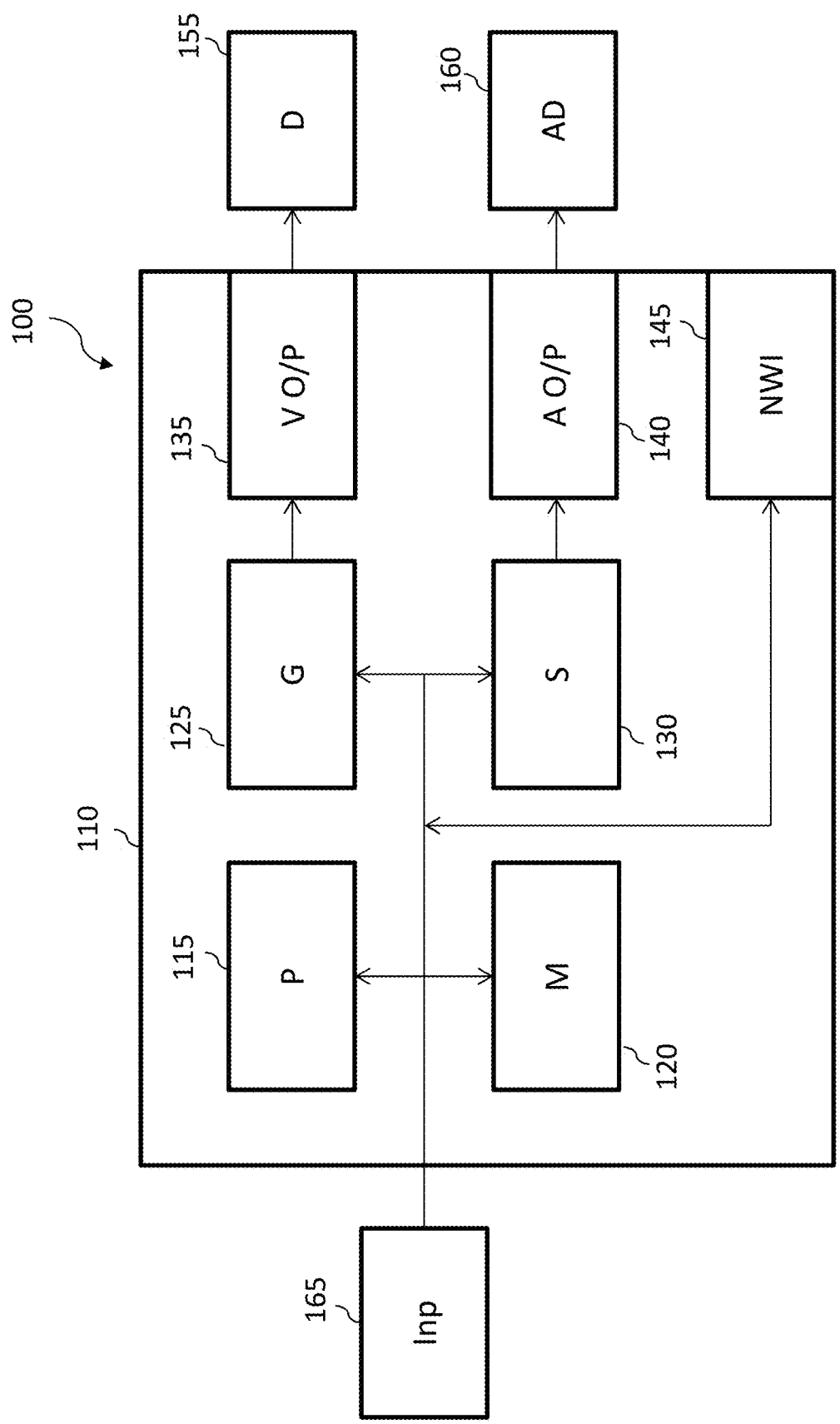
FIG. 1 shows an example embodiment of a game board.

A schematic view of a user or computing device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other via an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
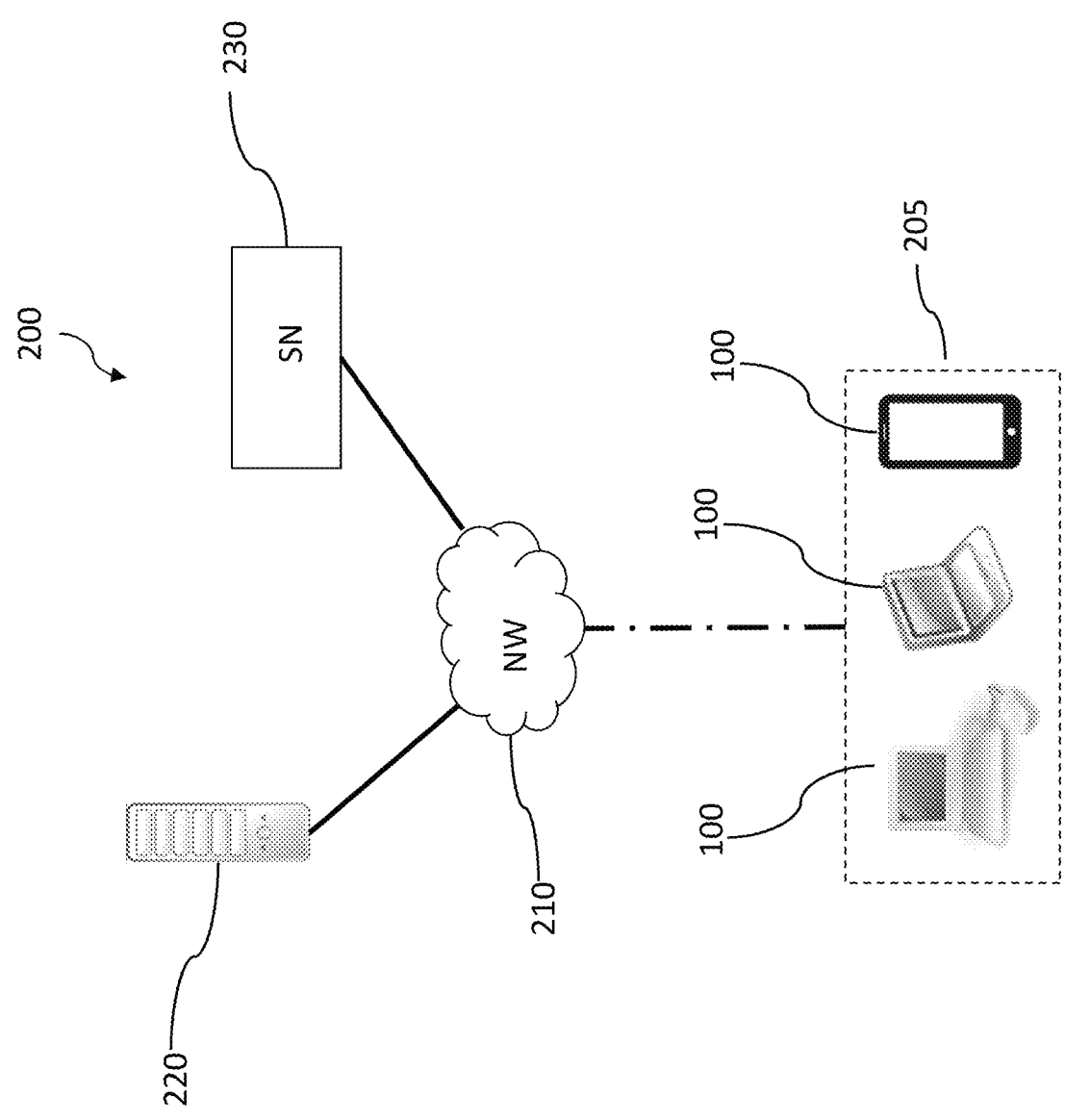
FIG. 2 shows an example system in which some embodiments may be provided.

FIG. 2 schematically shows a system 200 in some embodiments. The system 200 comprises a server 220 which may store electronic databases of game players' details, profiles, high scores and so on. In practice, one or more databases may be provided. Where more than one server is provided, the database(s) may be provided in one database or across two or more servers 220. The server 220 may also have a games data function. This may comprise a memory to store the computer game program and a processor to run the games program.

The server may communicate via the internet 210 to one or more user devices 205 and may further provide connections to a social network 230 such as Facebook™. As will be explained in more detail below, via the social network 230 the server 220 may be able to obtain user information. Such user information may include an avatar of a user. The avatar may be in the form of a user's profile picture. User information may also include details such as name, age, location of a user.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other user devices 205. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 200. Such an approach is sometimes referred to as a web services approach. It should be appreciated, however, that such an approach does not necessarily require the use of the Internet.

Figure 3:
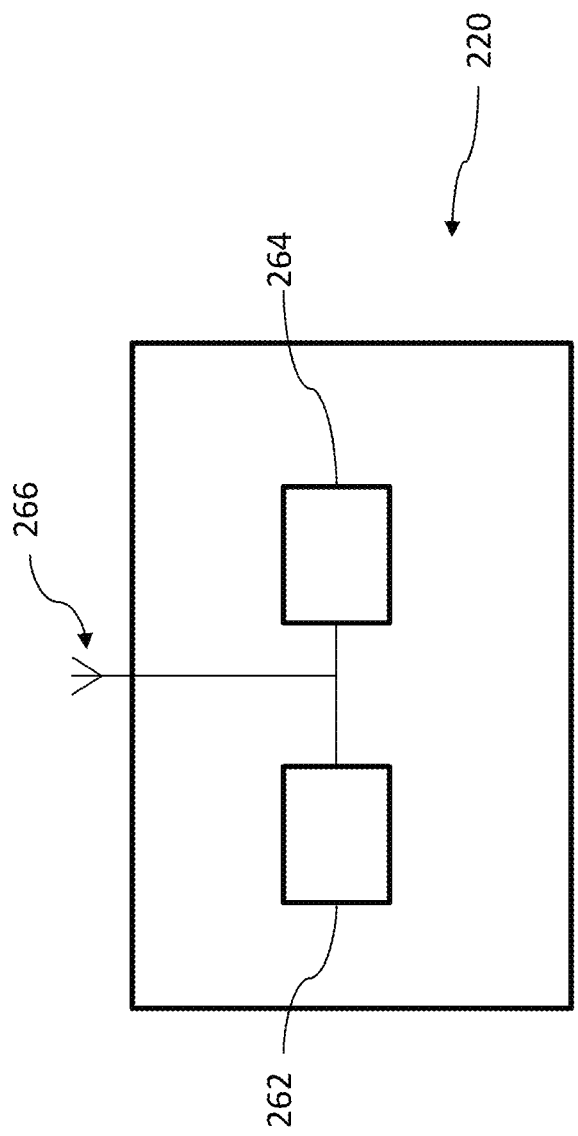
FIG. 3 shows an example of a server according to an embodiment.

FIG. 3 is a schematic diagram of the server 220. As shown in FIG. 3 the server 220 comprises at least one memory 262 and at least one processor 264. The server 220 further comprises at least one transceiver apparatus 266 for enabling the server 220 to communicate with other apparatus (for example user device 205, social network 230 etc.). The transceiver 266 may in some embodiments be in the form of a separate transmitter and receiver. The transceiver may also comprise a wireline connection.

Figure 4:
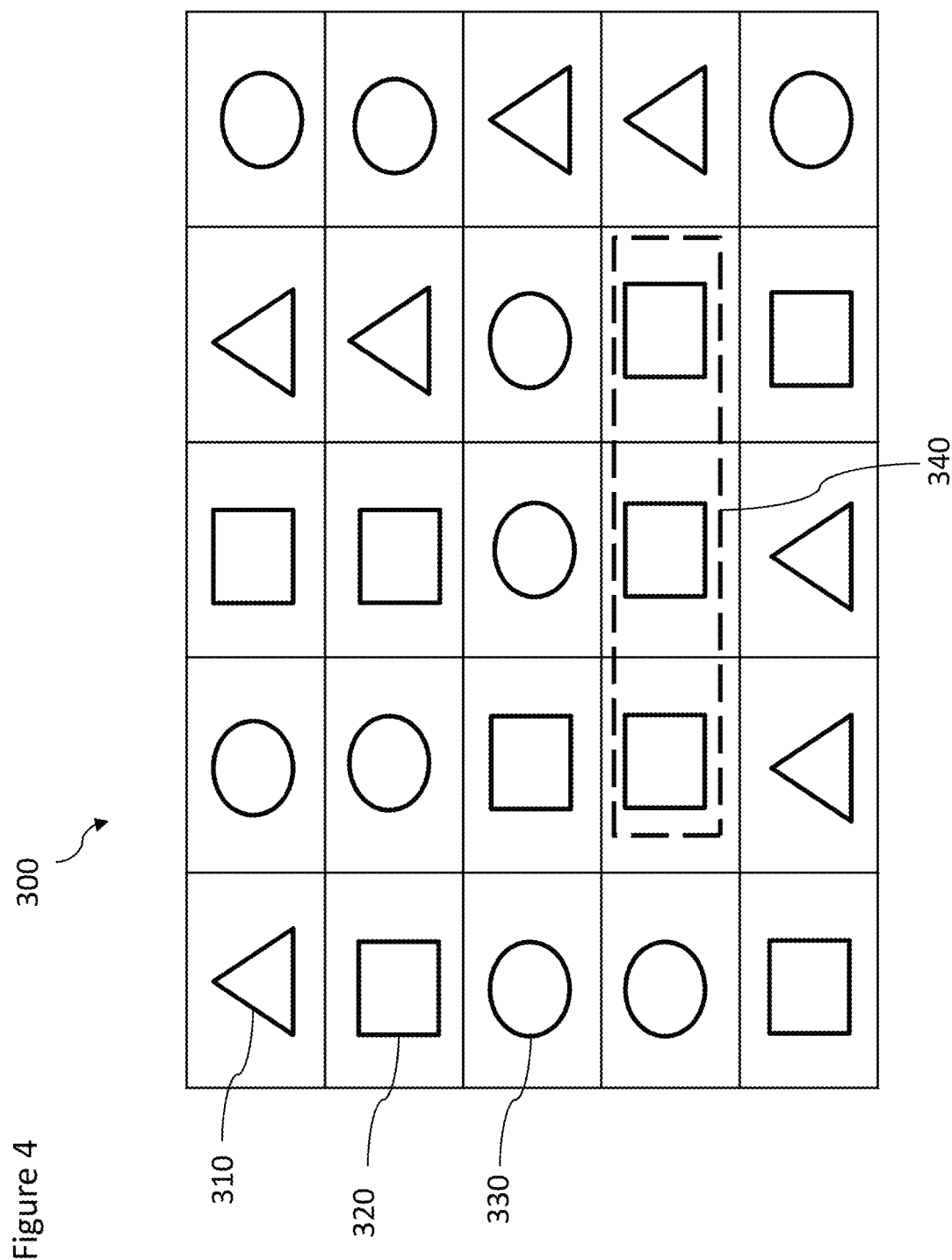
FIG. 4 shows an example game board of a computer-implemented game according to an embodiment.

FIG. 4 shows an example of a computer implemented game according to one embodiment. It should be understood that embodiments are not limited to this example and may include other computer implemented games.

The terms "user" and "player" are used interchangeably throughout this document and no specific meaning is intended using one or the other unless the context suggests otherwise.

A person skilled in the art will realise that the different approaches to implementing the game is not exhaustive; what is described herein are certain preferred embodiments. It is possible to implement the game in a number of variations without departing from the spirit or scope of the invention.

FIG. 4 shows an example schematic arrangement 300 for display on a user device according to an embodiment. An algorithm is configured to control the device such that an arrangement such as shown in FIG. 4 is displayed. The arrangement comprises a displayed game area 300 having first objects (also referred to as game elements or game objects) 310, 320, 330. In some embodiments the game objects are comprised in one or more respective game tiles. In some embodiments one or more game objects overlay one or more respective tiles. In some embodiments the tiles are not visible to the user, but the game objects comprised in the tiles are. In some embodiments each game object and/or tile has one or more attributes. Each attribute may have one or more possible values. The attributes may comprise colour, shape, and/or different types of objects with associated value. The first objects may have other characteristics defining graphical representations and shapes, and may represent different types of similar objects when displayed on the game area 300.

First objects 310, 320, 330 may be removed from the game board 300 by user input sliding a row or column of first game objects 320 to create a sequence. This may cause further game objects to then fall in to replace the removed objects. The sequence may require three or more first game objects having at least one attribute having the same value to be aligned adjacent one another in a row or column of said game area 300. That is the game may be considered to be a "matching" game. In some embodiments the game may be a match-3 category game, where the aim is to match 3 or more game objects. In some embodiments the game may be a "switching" or "swapping" game rather than a "sliding" game. In a switching game (e.g. Candy Crush™), a user can cause game objects to switch positions on a game board so as to try and create a matching sequence of objects on the game board.

In the example of FIG. 4, as represented by the dotted line 340, a user has aligned three game objects of the same type, in this case three squares. This may cause those game objects to be removed from the game board, with the game objects above falling in to place to replace the removed game objects.

A player may collect rewards (e.g. points, lives, credits, time etc.) by completing one or more game objectives or game criteria. In a match-3 game a game criteria is to match three or more game objects sharing a characteristic, as explained above. Extra rewards may be rewarded for matching more than three game objects (e.g. four, five etc.) sharing a characteristic.

In some embodiments a game criteria may comprise a number of subsidiary game criteria. For example an overall game criteria may be to reach a certain number of points. This may be achieved by completing a number of subsidiary game criteria (e.g. achieving one or more matches). For example an overall game criteria may be to achieve n match conditions on a game board. In embodiments n is a positive integer. For example a game criteria may be to achieve five match conditions.

The game may, in one embodiment, end if the player or user runs out of time or moves before managing to reach a designated target such as a score or moves (not shown in FIG. 4).

Those skilled in the art will appreciate that the arrangement of other grid sizes or patterns may be suitable.

The first objects 310, 320, 330 displayed on the arrangement 300 may have four (or any other suitable number of) contact points with other neighbouring or adjacent first objects.

Other game board layouts or configurations may be provided. For example, pyramidal, hexagonal, octagonal or other layouts comprising position spaces or tiles within the game board 300 may be provided for display.

The number of differing colours may for example be three or more colours.

In some embodiments, collaboration between players may be encouraged by incorporating one or more players within a game. The incorporation may be by way of graphical representation. In some embodiments one or more players' may be graphically represented within a game. The graphical representation may comprise a player avatar. The graphical representation may comprise a profile photograph of a user. The profile photograph may be obtained from an electronic database such as a social network. The terms "graphical representation", "avatar" and "profile picture" are herein used interchangeably. A game objective or game criteria may be associated with the one or more graphical representations. For example a graphical representation of a user may be "locked" within a game. A game criteria may be to "free" or "unlock" the avatar. Accordingly a game criteria may be to unlock a player associated with that graphical representation.

Figure 5:
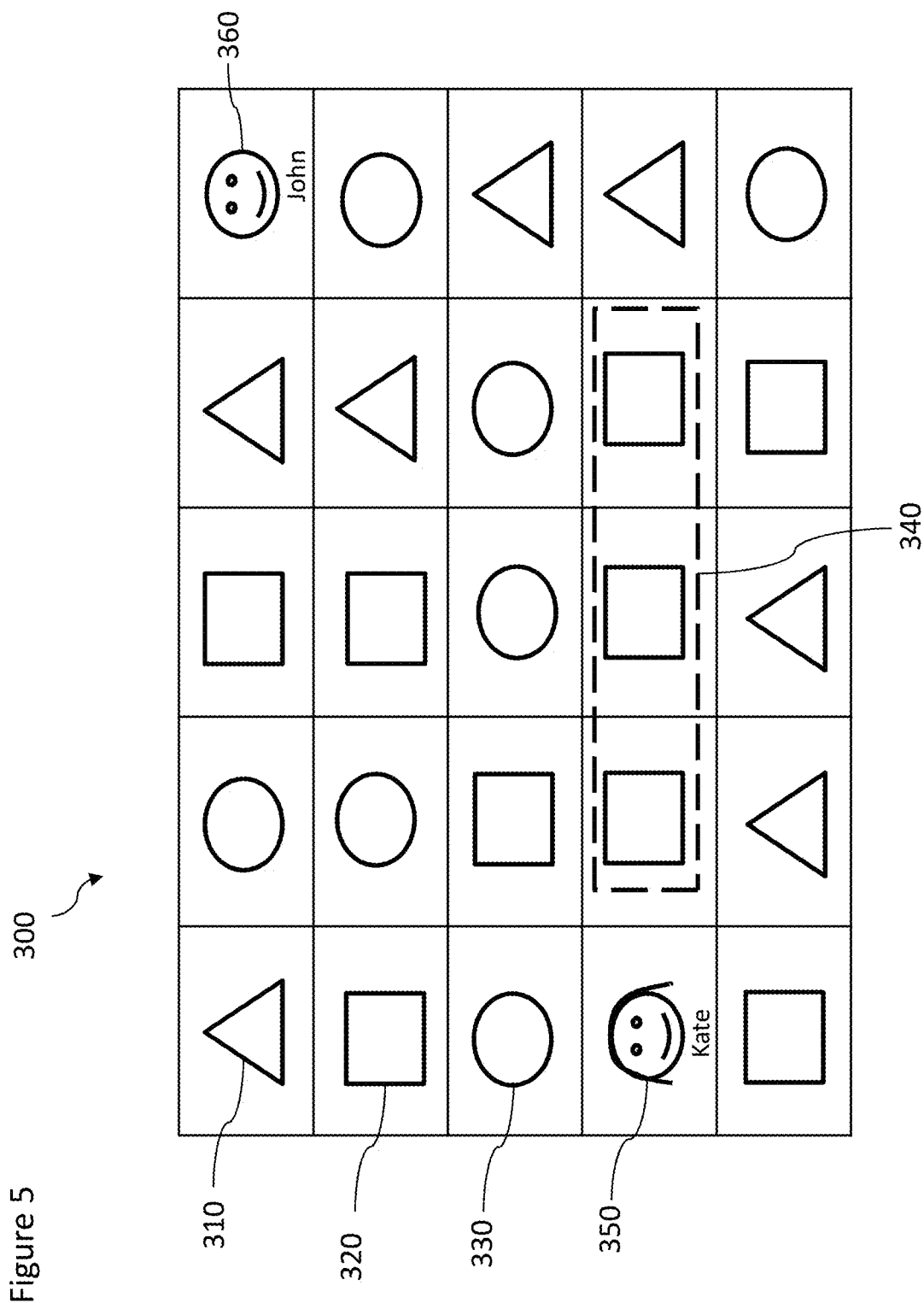
FIG. 5 shows an example game board of a computer-implemented game according to an embodiment.

The display of one or more graphical representations of users is schematically shown in FIG. 5. In the example of FIG. 5, by non-limiting example the graphical representations are in the form of avatars. Again, it will be understood that the game of FIG. 5 is by way of example only and that avatars may be displayed in other types of games. A first avatar is shown at 350. A second avatar is shown at 360. Although not shown in FIG. 5, a locked status of the one or more avatars may be graphically represented. For example, an avatar may be shown with a padlock symbol, or the avatar may be shown behind bars. Attainment and/or completion of a game criteria may unlock an avatar.

The type of game criteria required to release an avatar is not limited. For example the game criteria may be a subsidiary criteria within an overall game criteria. For example an avatar may be released in response to a successful move by a player. A number of successful moves may be required in order to unlock an avatar. A certain points total may need to be achieved before an avatar is released. Therefore it will be understood that in some embodiments an avatar may be unlocked in response to a target being met. The target may be determined by a game developer. The target may differ depending upon game and/or level difficulty.

Using FIG. 5 as an example, an in-game criteria may be to match game objects (e.g. as shown at 340). An avatar may be released each time one of these game criteria is achieved. For example the matching of the three squares shown at 340 may cause one or more of the avatars 350 and 360 to be released. In some embodiments the one or more avatars are only released after an in-game target has been reached by a user. For example the in-game target may be to make a certain number of matches or to reach a certain number of points.

In some embodiments the avatar (or indeed any other type of graphical representation of a user) is associated with the game criteria. For example interaction with an avatar may be required in order to meet the game criteria. Again using FIG. 5 as an example, a game criteria may be to match game objects adjacent to an avatar. For example, the avatar 350 may be released in response to the adjacent matching shown at 340. By "adjacent" may be meant bordering a game object involved in the match condition. The bordering may be above, below, to the right or left, diagonally bordering etc.

In another game mode, the criteria may be to move an avatar down to the bottom row of the game board by causing game objects below the avatar to be removed. Once the avatar reaches the bottom row then the avatar is released or unlocked.

In some embodiments an avatar can be released in response to a game criteria being satisfied at a location on a game board remote from a location of the avatar that is being released. That is in some embodiments it is not a requirement for the avatar itself to be part of a match condition or adjacent to a match condition, for that avatar to be unlocked. For example a game criteria may be satisfied in response to an nth match condition, which causes an avatar to be released regardless of whether the avatar in question is adjacent to or part of the nth match condition.

In some embodiments a match condition may indirectly cause a game criteria to be satisfied. For example a match condition may cause a "booster" tile or object to be activated. The booster tile may cause a number of further game objects to be removed and/or released from the game board, including one or more avatars. For example a match condition may occur at a location on the game board that is spaced or remote from the graphical representation of the second user. Nevertheless such a match condition may cause, for example, a "line blaster" tile to be activated which removes an entire line of objects from the game board. The removal of this line may then cause the game criteria to be achieved, for example by the causation of further match conditions or because the graphical representation is directly removed from the game board as a result of the line blast. It will of course be understood that this is by way of example only and that other game functions and/or boosters may cause the game criteria to be satisfied indirectly.

In some embodiments there might be a further object associated with an avatar tile, and the game criteria may be to remove that at least one further object from the game board.

In some embodiments the avatar is comprised in a game object. For example an avatar may be displayed on or within a game object. In such an example the avatar may comprise a characteristic of the game object to which it has been associated. For example the avatar 350 may be displayed within a square 320. When the square 320 is matched up with two (or more) other squares, then the avatar 350 within square 320 is released.

In some embodiments an avatar may itself comprise a game object. A game criteria may be to match up avatars in order to release them.

To this end an avatar may be duplicated within a game. For example an avatar of the same person may be displayed a number of times on a game board. The objective may be to match-up matching avatars.

The avatar or avatars may appear at any point within a game. For example the avatar(s) may be displayed at the start of a game. Avatar(s) can additionally or alternatively be added to the game or removed from the game during game play.

In some embodiments, an identifier may be displayed along with or instead of an avatar. For example, and as shown in FIG. 5, a user's name associated with an avatar may be displayed. For example, as shown in FIG. 5, avatar 350 is an avatar of "Kate", and avatar 360 is an avatar of "John". The identifier may be displayed in any way. For example the identifier could be displayed above, below, adjacent to, overlaying the avatar etc.

According to some embodiments the graphical representations associated with users are obtained from one or more electronic databases. Each database may comprise a social network. The social networks may comprise, for example, Facebook®, Twitter®, Instagram®, SnapChat®, LinkedIn®, MySpace®, Whatsapp® etc. The database may be a database of a game server. For example the database stored on the game server may be a database such as Kingdom. Each entry in the database may have an associated user ID.

The database may comprise score and/or ranking information. For example the database may comprise a scoreboard or a leaderboard.

In some embodiments each graphical representation associated with a user comprises a profile photo obtained from a social network. In some embodiments one or more of the graphical representations comprises a Facebook® profile photo.

The graphical representation of a user can be obtained from a database or social network. Obtaining the graphical representation may comprise sending a request to the database or social network for the graphical representation. The method may therefore comprise receiving the graphical representation of a user in response to a request for the graphical representation. The graphical representation may therefore be considered to have been retrieved from a database.

The graphical representations of users may be generated in the game using information obtained directly from the database (e.g. social network). This may occur in real-time. Graphical representation information may additionally or alternatively be stored in the memory 120 of the client device and/or the memory 262 of the server. The graphical representation information can then be obtained from one or more of those memories as and when required.

One or more editing functions may be carried out on the graphical representation before it is incorporated in to the game. For example the graphical representation may be scaled and/or re-sized. In some embodiments the editing is carried out in dependence on one or more game characteristics. For example the one or more game characteristics may include a type of game, and/or a type of game object to which the graphical representation is to be applied.

Editing of the graphical representation may be carried out in dependence on a type of device on which the game is being played. For example if the game is being played on a user device with a relatively small display, then the graphical representation (e.g. profile photo) may need to be scaled-down in order to fit on that display.

In some embodiments the selection of one or more graphical representations is carried out by the game server 220 operating in conjunction with the social network 230. In this example the social network 230 is Facebook.

In embodiments access to a player's contacts in a social network is enabled. For example, a player may log-in to the game via the social network. Alternatively the player may log-in to the game using their username and password for the social network, without having to have logged in to the social network. In some embodiments the user may have to explicitly authorise access to their contact list, for example by clicking "OK" or ticking a box in a list of one or more required authorisations associated with the game.

Therefore in embodiments the server 220 has access to the social network contacts of the player. In some embodiments access to one or more contacts may be restricted. This may be by way of selection by the user. Access to avatars may be restricted in dependence on one or more privacy settings of the social network contacts.

In some embodiments the server 220 may have real-time or instant access to the social network contacts of the player. In such embodiments the server can obtain information from the social network whilst the game is being played.

In some embodiments the server 220 stores information of the social network contacts of the player in the memory 264 of the server. The stored information may include one or more of information such as: profile picture (graphical representation) information; name information; address information etc.

Therefore server access to graphical representation information may be enabled. This information can also be stored in memory 120 of user device 100.

A determination can be made as to which graphical representation or graphical representations to display in the game context.

The graphical representation or graphical representations to be used in a game context may be selected based upon one or more parameters. For example such parameters may include (but are not limited to):

A ranking of a user associated with a graphical representation. For example if a graphical representation is associated with a user who also plays the game in question, then a ranking may be assigned based upon how good that user is at the game. Players of a similar ranking may be matched. For example if a first user is playing the game, then the server may seek to include one or more graphical representations of further users who are of a similar ability to the first user. The server may seek to include one or more graphical representations of further users who are on the same level as the current player.

Whether that graphical representation has been used in a game before. For example a graphical representation might be more likely to be selected if it is determined that that graphical representation has already appeared in a game. Alternatively a graphical representation might be more likely to be selected if it is determined that that graphical representation has not been used before, or if it has not been used for a certain period of time. The server may determine to include graphical representations of users who are playing the same game as the current player. The server may determine to include graphical representations of users who are playing a different game to the current player. This may encourage users to try new games. A link and/or invitation may be transmitted to the other users in order to get them to try the game.

Reciprocation information. For example a player playing a game may be considered a first user. A graphical representation to be included in the game of the first user may be associated with a second user. The graphical representation of the second user may be selected to be included in the game of the first user, when it has been determined that a graphical representation of the first user has been previously displayed in a game of the second user.

An indication that a user wants to be involved in the game. This information may be inferred. For example if a second user has logged in to play the game, then it may be more likely that a graphical representation of the second user will appear in a game of the first user. The indication may also be expressly given, in some embodiments. For example a second user may give an express indication that they want to be involved in a game of another user. In some embodiments users can specify in whose games they would like to be involved.

In some embodiments the selection parameters can be ordered by importance. For example the method may involve first looking to find a player who wants to be involved in the game. If a player who wants to play cannot be found, then the method may involve then looking at the next ranked parameter e.g. it may then look for a player who has been used before, and so on.

Figure 6:
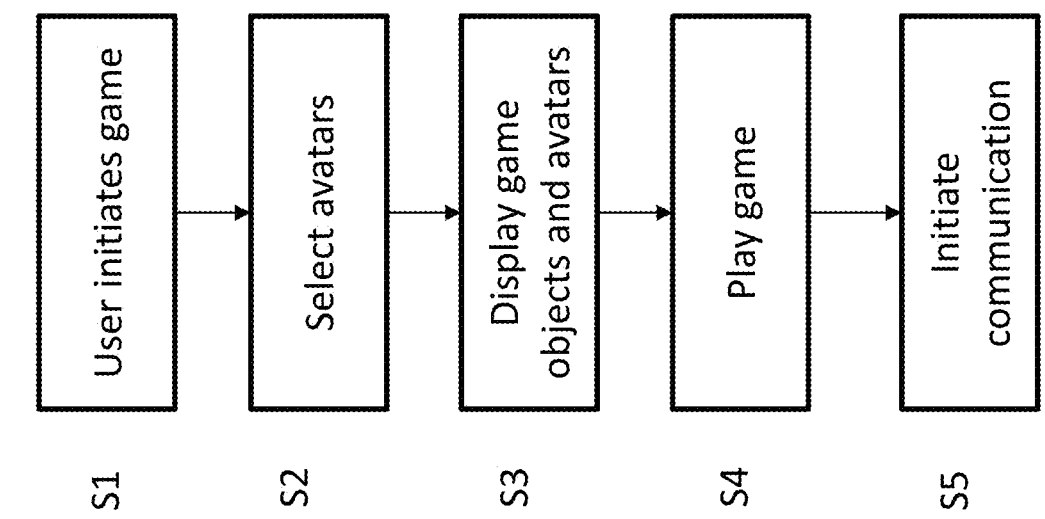
FIG. 6 shows an example flowchart according to an embodiment.

A process of selecting a graphical representation for a game is schematically shown in the flow chart of FIG. 6.

First, a first user initiates a game on their device 205. This is shown at step S1 in FIG. 6. In order to initiate the game the user may have already downloaded the game from the server 220.

In embodiments, the game comprises one or more game objects. Information of these game objects is stored in a memory, such that the information can be retrieved from the memory to be displayed on a display of the user's device, for example in a manner as shown with respect to FIG. 4.

The graphical representations to be displayed in the game can be determined. This is shown as step S2 in FIG. 6. This step may comprise determination of one or more parameters, as explained above. The graphical representation may be considered to be that of a second user. In at least some embodiments the second user may not be playing the game themselves (and may initially not be aware that their graphical representation has been included in the game of the first user).

The game can then be displayed to the first user, showing the game objects and the one or more graphical representations of further (second) users. This is shown as step S3 in FIG. 6.

The first user can then begin playing the game, as shown at step S4.

As shown at step S5, communication can then be initiated between a first user playing the game, and one or more second users associated with graphical representations within the game. This is explained in more detail below.

The communication may be initiated in response to a game event. The game event may comprise completion of one or more game criteria. Alternatively the game event may comprise a failure to complete one or more game criteria.

For example, and with reference to FIG. 5, a user playing the game of FIG. 5 may be considered a first user. Avatars displayed within the game are associated with further users. For example avatar 350 is associated with a second user (in this case "Kate"). In this case the first user has completed a game criteria by matching three squares, as represented by dotted line 340. As previously discussed, this may cause the avatar 350 of the second user to be released or unlocked.

In response to this unlocking of the second user, communication may be initiated with the second user. The communication may be by way of a message or notification transmitted to the second user. This message can be transmitted from the user device 205 of the first user to a user device of the second user. This message may be transmitted directly to the second user, or may be transmitted to the user device of the second user via the server 220. Alternatively the message can simply be transmitted from the server 220 to the user device of the second user.

The message may inform the second user that they have been unlocked or "freed". Therefore the message may say something like, "Freddy has freed you!" (where the first user is called Freddy). A generated message may also encourage the second user to then play a game by saying something such as, "Why not play the game to free some of your friends?!" This may be a separate message or part of the original message.

Alternatively, if the first user has failed in their attempt to complete a game objective, then an appropriate message may be transmitted to the second user informing them as such. For example, the message may state "Unlucky! You are still locked!"

The message may also initiate a conversation between the first user and the second user. The first user and second user can then communicate with each other through this established conversation. For example communication between the first and second user may be by way of instant messaging. The instant messaging may enable the first and second users to communicate in real-time.

In some embodiments the messaging may be carried out within the game. If the second user is already playing the game, then the message may be transmitted to them as an in-game message. In one embodiment, the second user will receive the message the next time they log-in to the game, if they are not currently playing.

The message can additionally or alternatively be pushed to the second user. For example the message can be transmitted to the second user via any of the following (by way of non-limiting example): Facebook® Messenger; a message on the second user's Facebook® wall; email; text message; Whatsapp® message; Skype® etc.

Figure 7:
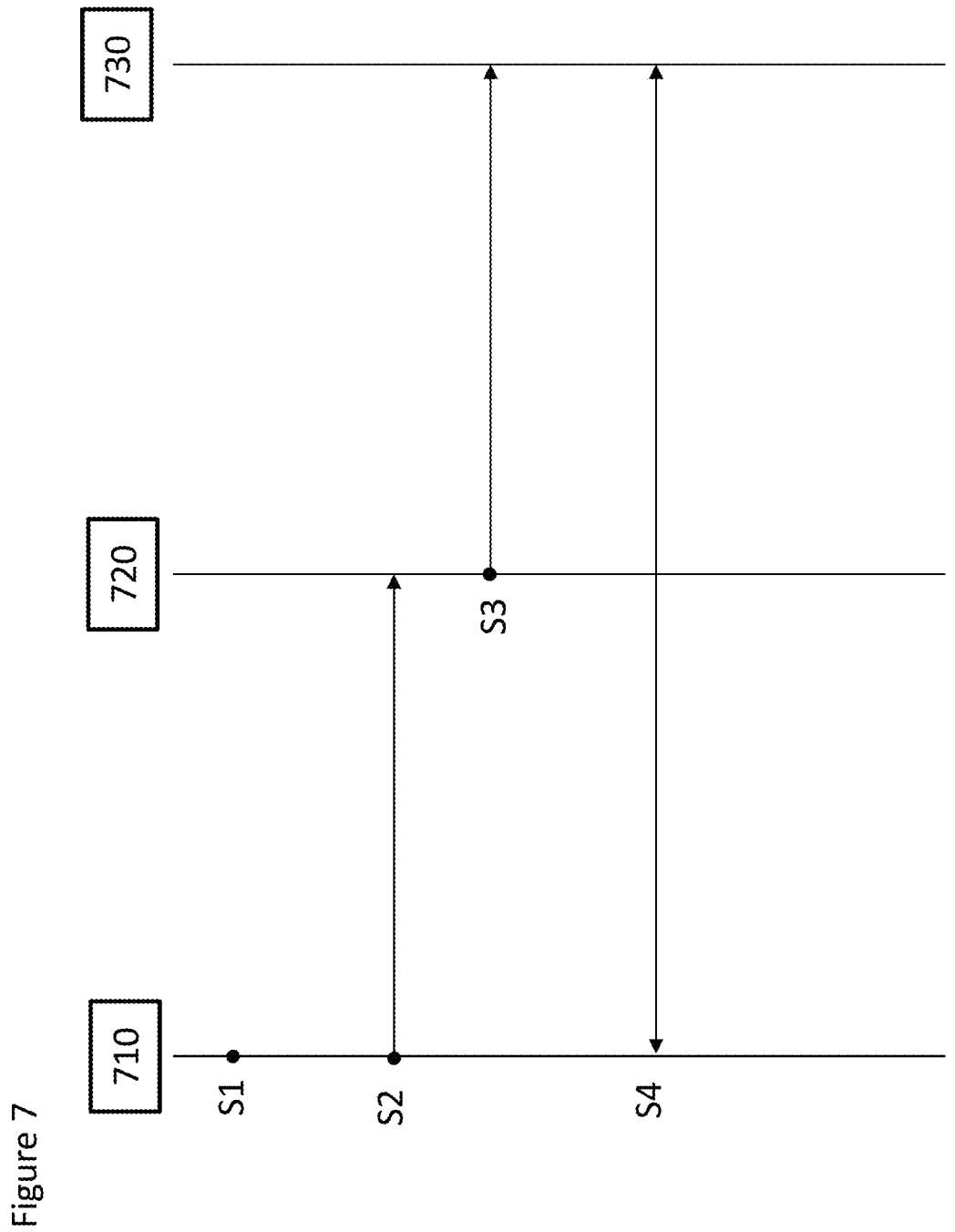
FIG. 7 shows an example signaling diagram according to an embodiment.

Messaging according to an embodiment is shown in the signalling diagram of FIG. 7.

In FIG. 7, the first user is shown at 710, the game server is shown at 720, and the second user is shown at 730. It will be understood that reference here to a first user may equally mean a user device of the first user, and reference to a second user may equally mean a user device of the second user.

At step S1 the first user 710 is playing a game. In this game the second user 730 is displayed as an avatar.

At step S2 a game event occurs, such as a game criteria being satisfied. For example the first user has released the graphical representation of the second user in the game. Accordingly a message is transmitted to the server 720 to inform the server 720 of this game event.

At step S3 a message is transmitted from server 720 to second user 730. This message informs the second user of the game event. For example a notification may be displayed to the second user, informing the second user that they have been freed. The notification may be an automatically generated message. The message of step S3 could alternatively be transmitted directly from the first user 710 to the second user 730.

Optionally, at step S4 a conversation between the first user 710 and the second user 730 may be initiated. As shown, the conversation may take place directly between the first user 710 and the second user 730. Alternatively, the messages between the first user 710 and second user 730 are relayed by the game server 720.

As mentioned above, the messaging may utilise different services e.g. Facebook®, email etc. Therefore, although not shown for clarity in FIG. 7, the messaging may also include a messaging server, such as a social network server and/or an email server etc. For example the message transmitted at step S3 may be transmitted to a Facebook® server (not shown) before it is transmitted to the second user 730.

In some games, such as an online role playing game (RPG), multiple players may be playing in the same virtual world. According to embodiments each player in the game is represented by a graphical representation such as an avatar. These avatars may have been selected in the manner previously discussed. According to some embodiments, players can help each other within the game. For example, for some reason a second user may find themselves locked in a game. For example, due to a bad move the second user may find themselves locked in a prison in the virtual world, unable to continue until they have been freed. If a first user performs a game event which causes the second user to be freed, then the second user is notified as such. If the notification is pushed to the second user (e.g. via Facebook®), then the first user can learn that they are free to continue the game even if they are not playing the game at that time.

Once communication is initiated between the first user and the second user, then in some embodiments those users can communicate with each other within the game. For example the first user and the second user may need to work as a team to complete a game objective, which may be facilitated by communication between the first user and the second user. This communication may be carried out in any way, for example any of the messaging options discussed above. In some embodiments the two-way messaging between users may comprise in-game messaging. Although in this example communication between two users has been discussed, it will be understood that the communication may be between any number of users within a game.

According to some embodiments, the graphical representation may be associated with a user who is not playing the game. In some embodiments the graphical representation may be associated with a user who is not associated with the game. For example the graphical representation may be associated with a second user (where the first user is actively playing the game). The second user may be unaware that their graphical representation is being used in a game of the first user.

In some embodiments, characteristics of a player in one game may be transferred to another game. In some embodiments one or more characteristics selected by a first user may be retained when that first user is represented in a game of a second user. For example, a first user may have selected in their own game that they want to be a particular type of character, such as an elf or a goblin or any other type of character. When the first user's avatar is selected for use in a game of a second user, then those characteristics may be retained. That is the first user may be represented as an elf or goblin (or any other selected character) in a game of a second user.

According to some embodiments, rewards may be provided to one or more users. For example a reward may be given to a first user in return for freeing a second user. The reward may be extra lives and/or extra points, for example. The second user may also be rewarded for being freed. For example the second user may be given some additional lives, in order to encourage them to continue playing.

According to some embodiments game play in a first game may influence game play in a second game. For example the actions of a first player in a first game may affect a second game being played by a second player. For example if the first user has killed an enemy in their game, then that enemy may also cease to exist in the game of the second player.

In some embodiments a user may be transmitted a link to view a replay of a game event. For example a first user may have freed an avatar associated with a second user. A message may be transmitted to the second user, the message comprising a link. When the second user follows the link they are shown a replay of them being freed.

In some embodiments, rewards may be transferred between users. For example a second user may transfer some of their lives and/or points to the first user, in return for being freed by them.

Figure 8:
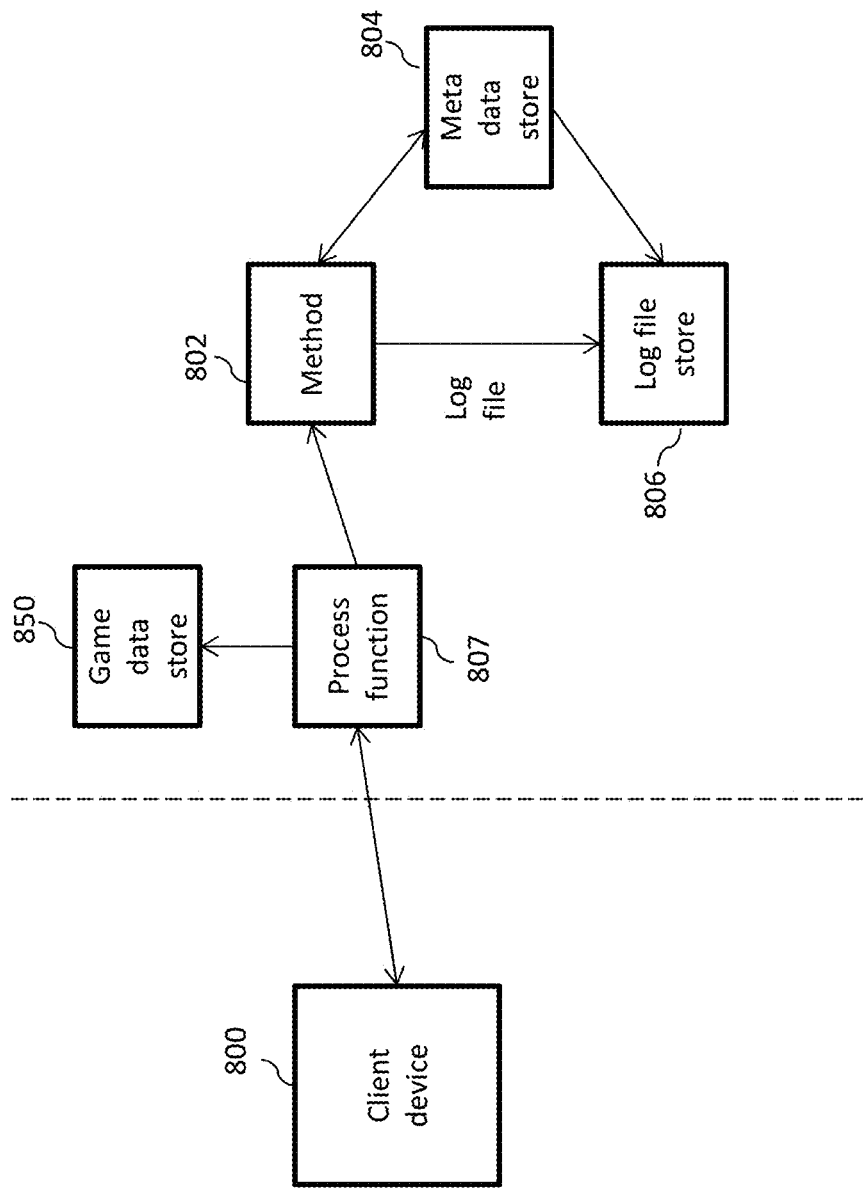
FIG. 8 schematically shows some of the functions provided by a server, according to some embodiments.

FIG. 8 is schematic and shows some of the functions provided on the server side. The physical entities which provide these functions may be any one or more suitable entities. The client device 800 (which may be as discussed in relation to FIG. 1) will allow the user to play the game. The client device will determine when a particular game event occurs and cause the client device to make a call to the method 802 which is on the server side. A process function 807 which may be provided by a server or the like will receive the call. The call is then directed to the method 802 by the process function. The method 802 may be on the same server as the process function or a different server to the process function. The server side also has the game data store 850 which stores a user's data, such as progress data or the like. Data for the game data store 850 may be received by the process function and directed to the game data store. In response to the invoking of the method 802, a log file is generated and is stored in a log file store 806. Any suitable data store 806 may be used to store the log file data 806, which may be the form of text files, as discussed above.

Meta data may provide a key to the data stored in the log files in the log file store. This will define for each of the game event identifiers, the format of the information stored in the log file. A separate store 804 can be provided for this metadata. This metadata store 804 can be used to determine how to parse the stored log files and allows new queries to be formulated easily. Analytics for the data can be determined by using the information in the metadata store to form queries which can then be used to parse the data store which has the text data files.

It should be appreciated that the data in the log file may be provided by the client device. This data may be some of the data to be stored in the game data store and/or may be provided specifically for the log file. The server side may provide data such as for example time stamp information or the like.

The same method associated with the end of game event is used by one or more games. This means that all the log files associated with that same end of game method will have the same identifier so that analytics can be performed across more than one game. Like for like comparisons can be made for the same event across different games.

It should be appreciated that there may be a plurality of instances of the method which can be called. The methods will however be the same for the same associated game event, regardless of the game.

When writing a new game, a decision can be made as to what game events are to cause the generation of a log file. For each of those game events, a method stored on the server side will be invoked or called. The method which is stored on the server side will be the same regardless of the game. The game developer will therefore not need to write new code for the reporting associated with a particular game event. The game developer may make sure that the code generates the information, for example parameter values, for the method and that the particular game event will cause the client device to call the server. The game developer may need to ensure that the semantics used in the game match the semantics used in the game event method.

It should be appreciated that embodiments may be used with any suitable game event. The game event may be the completion of a level, the start of a game, the ending of a game, purchasing of a particular item, interaction with one or more friend, a particular score or the like.

It will therefore be understood that in embodiments there is interaction between the client device 100 and server 120.

It will also be understood from FIGS. 1 to 3 that the client device and the server may each comprise their own memory and processing entities. Accordingly, where applicable, tasks described could take place at one or both of the client device and server device. In some embodiments this may depend upon whether the user device is in an online or an offline mode.

For example, as shown in FIG. 1, the user device 100 comprises a memory 120. As shown in FIG. 3 the server comprises a memory 262. One or both of the memory 120 and 262 may store information of one or more game objects, for example. One or both of memories 120 and 162 may store graphical representation information, for example.

As shown in FIG. 1, the user device 100 comprises a processor 115. As shown in FIG. 3, the server comprises a processor 264. One or both of the processors 115 and 264 may carry out tasks associated with the described method.

By way of example only, when in an offline mode, the processor 115 of the user device may determine which game objects and graphical representations stored in memory 120 of the user device to display in the game.

When an online connection is available between the user device 100 and the server 120, then memory and processing duties may be carried out by the server, or these tasks may be distributed between the client device 100 and the server 120.

The realisation of the game may be facilitated by information exchanged between the client device 100 and the server 120. For example, if the server determines that a certain graphical representation is to be used in the game, then the server may instruct the client device by way of appropriate messaging to use that graphical representation (and/or the server may send the necessary avatar information to the client device).

Figure 9:
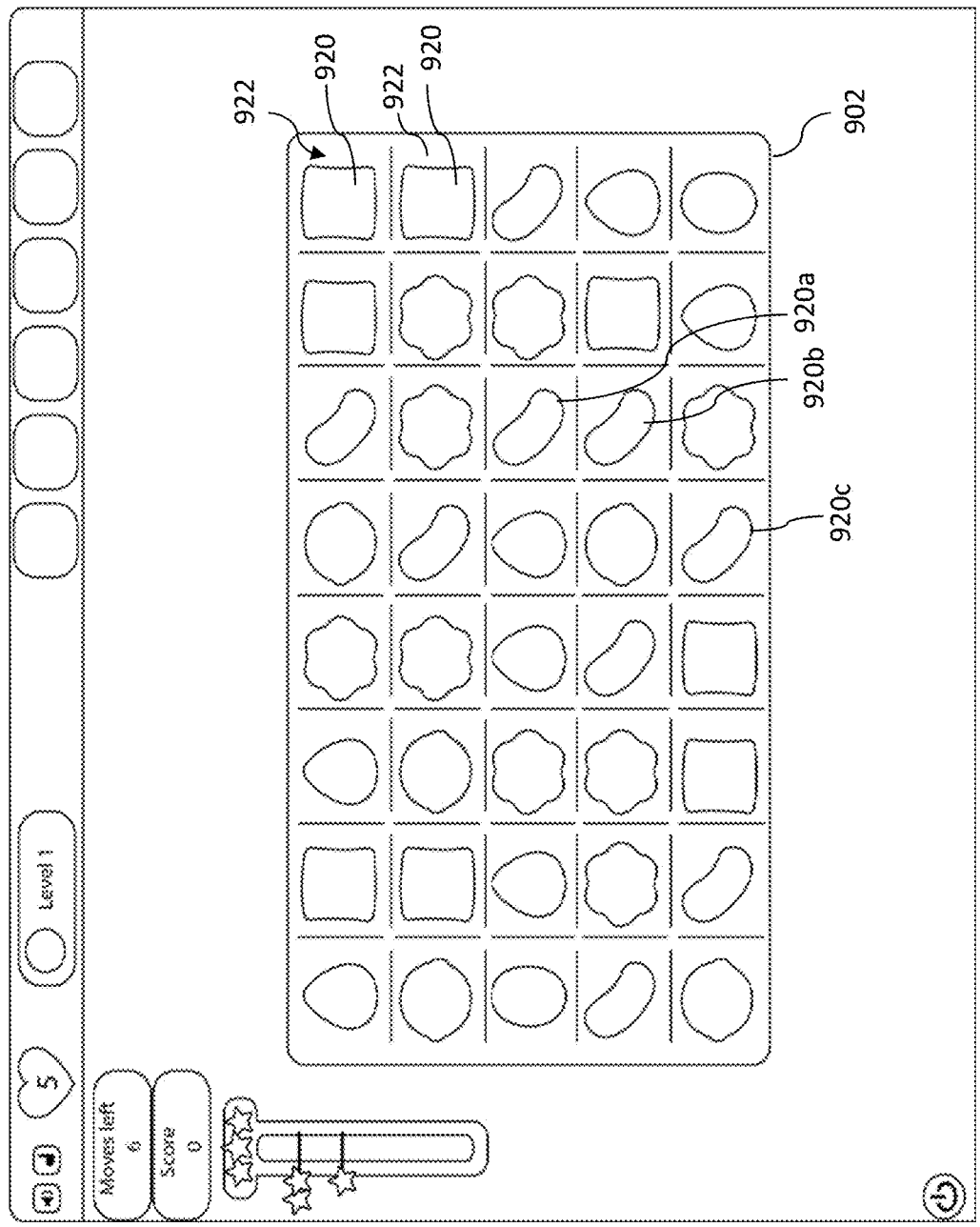
FIG. 9 shows an example game board of a computer-implemented game according to an embodiment.
Figure 10:
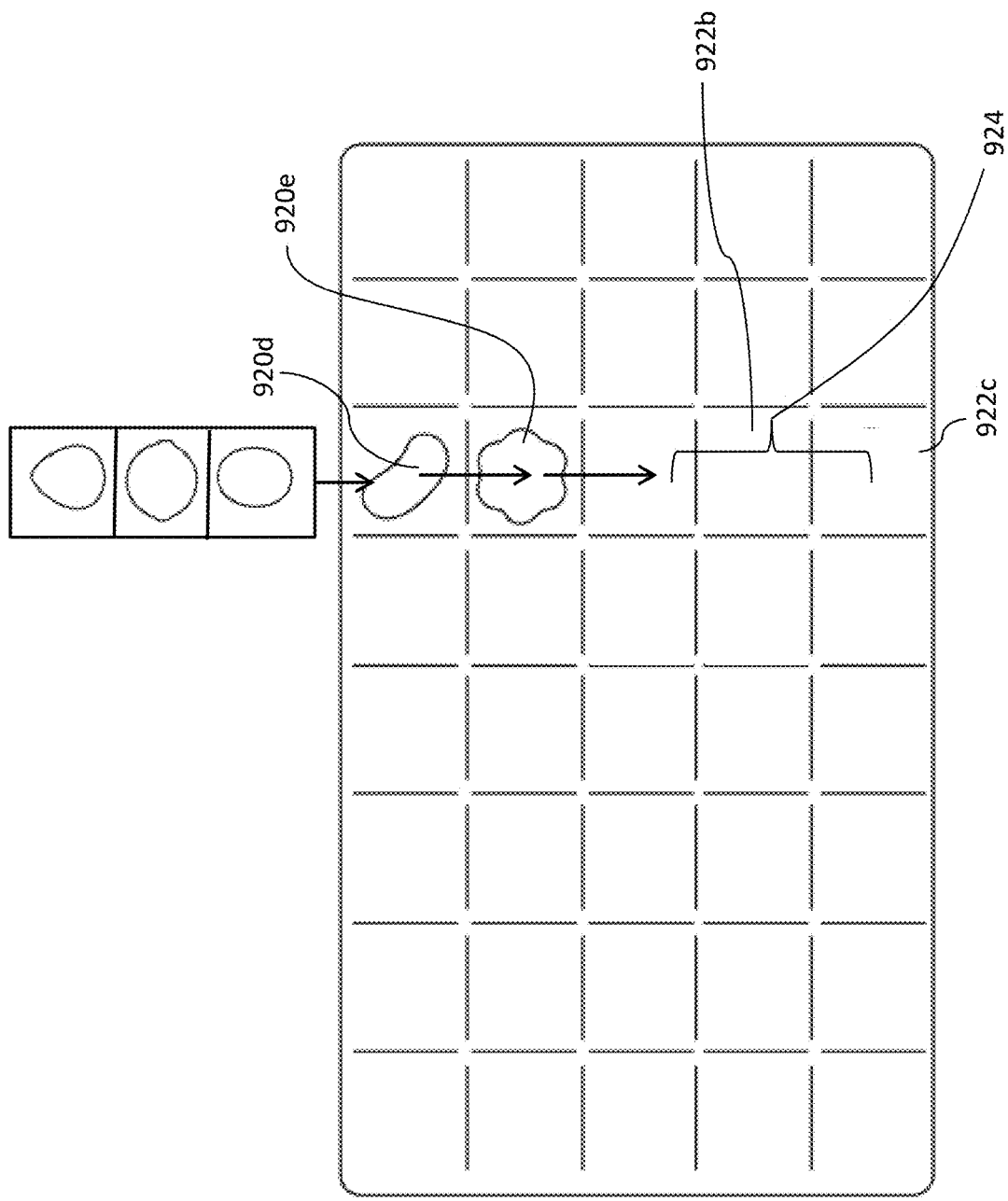
FIG. 10 shows an example game board of a computer-implemented game according to an embodiment.
Figure 11:
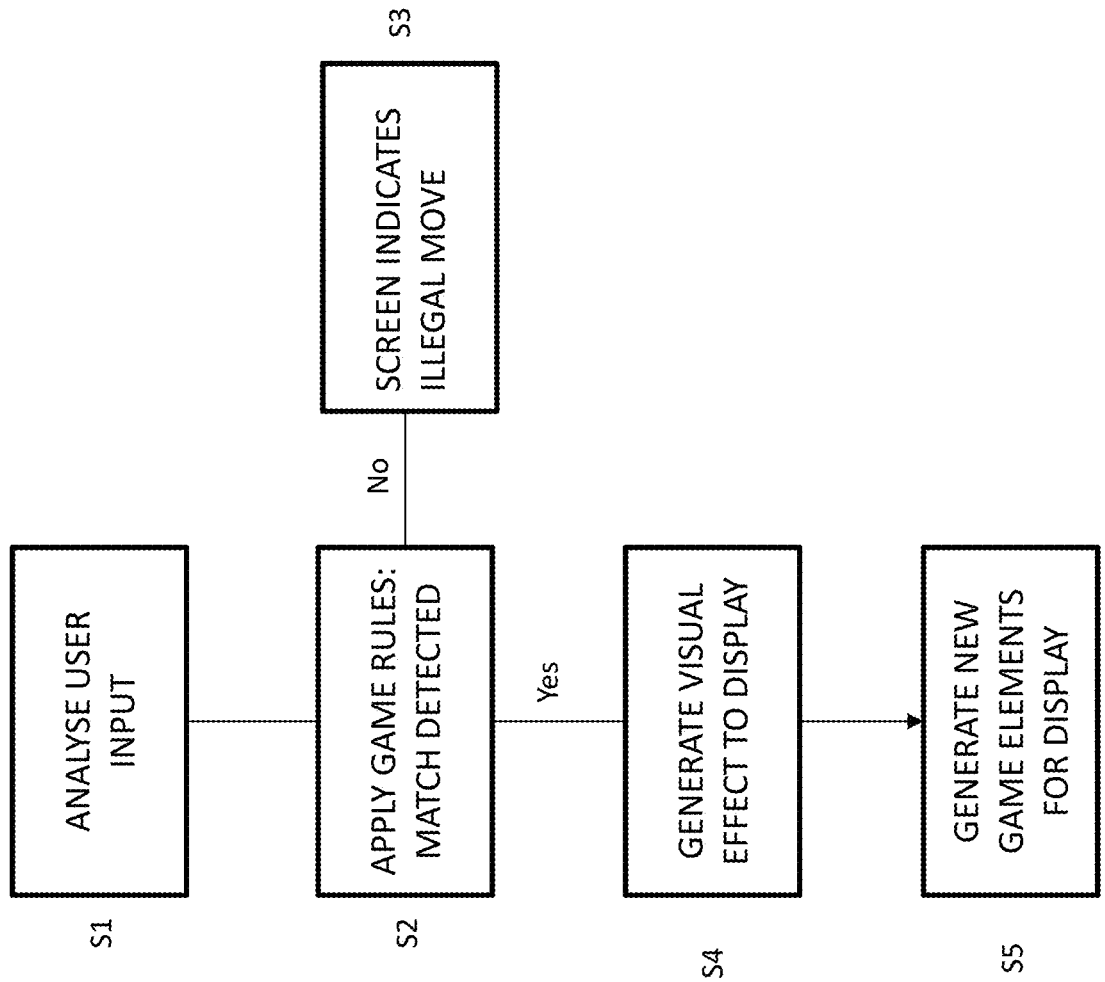
FIG. 11 shows a flow chart according to an embodiment.

A "switching" game, as discussed above, is described in more detail with respect to FIGS. 9 to 11.

FIG. 9 shows a display of a known version of a match 3 switch game called Candy Crush Saga™. FIG. 9 illustrates a game board 902 with a plurality of game objects 920. In this embodiment the game objects are each of six different shapes and colours. In other embodiments different shapes and colours may be provided. Each game object is supported by a tile 922. The tiles may not be readily visible to a player of the game—that is in some embodiments the game elements or game objects are the main focus for a player. However, the tiles may govern characteristics of the game elements which are visible to a player as will be described in more detail below.

In the known version of the match 3 switcher game, the aim of the game is to swap game elements in the shape of candies or sweets with each other to make moves on the game board. To gain points the player has to make one or more moves that create matches of at least three of the same candy. In doing so, the player gains points and the matched candies are removed. As a result new candies fall into place from the top of the game board in order to fill any spaces created.

Assume for example in FIG. 9 that game element 920c is moved one place to the right to form a three-line match with game elements 920a and 920b. Turning now to FIG. 10, this has the effect of game board elements 920a, 920b and 920c "disappearing". The disappearance of these elements may include creating a visual effect and/or animation on the screen to indicate the disappearance, such as a minimal explosion effect denoted 924 in FIG. 10. The two game elements which were directly above game elements 920a will now fall downwards into the spaces created by the removal of game elements 920a, 920b and 920c. Thus, game element 920e will end up at the location of tile 922c, and game element 920d will end up at the location of tile 922b. In addition, three new tiles with game elements are "created" and fall downwards into the game board to fill the remaining three spaces above tile 922b. The game elements on the newly created tiles which fall downwards into the game board may be generated at random. The user then has a new game board on which to play a subsequent move.

Figure 12:
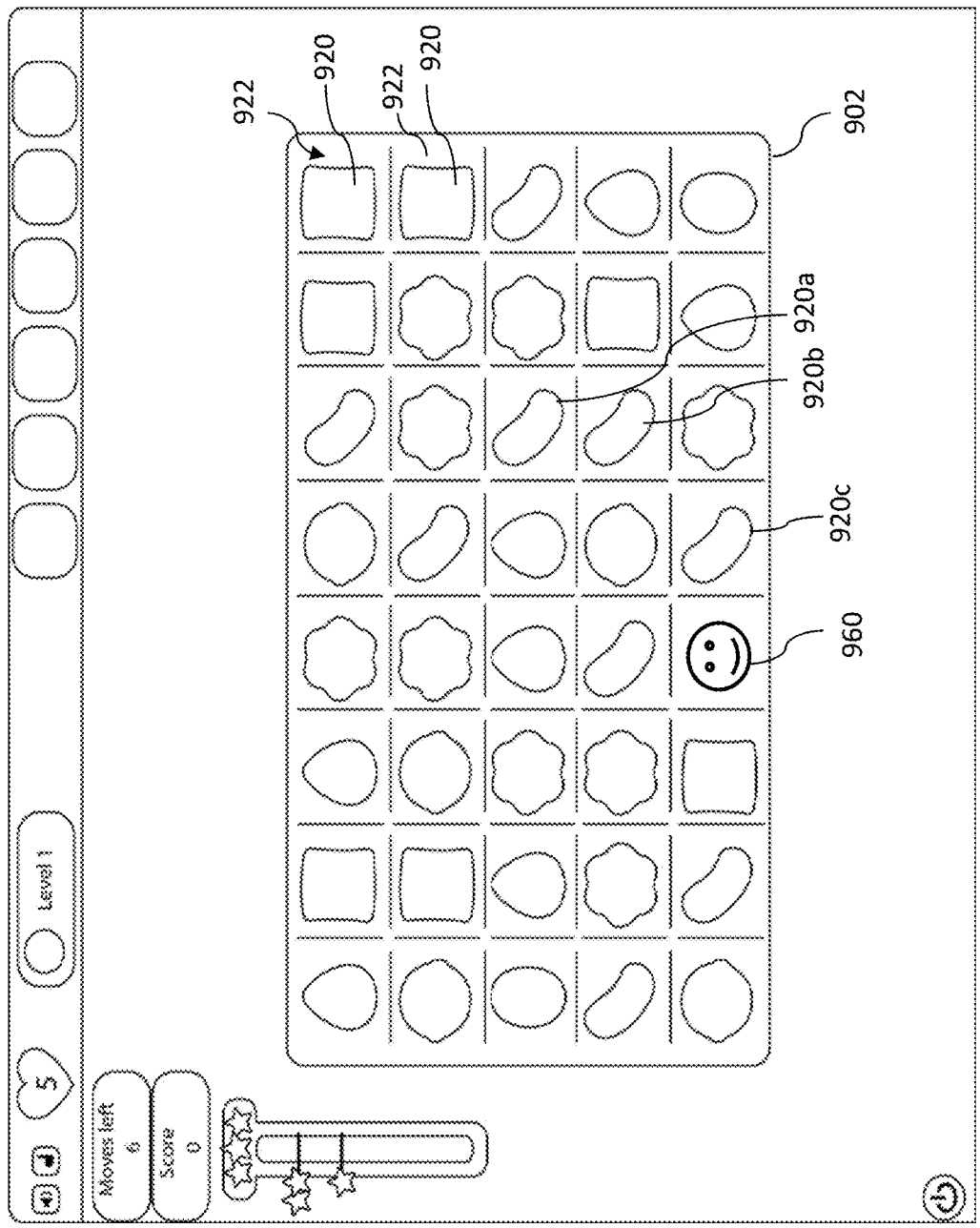
FIG. 12 shows an example game board of a computer-implemented game according to an embodiment.

FIG. 12 is a flow chart illustrating a process implemented by software in a processor for executing the basic game mechanic discussed above. At step S1 an input made by a player on the screen is analysed. At step S2 the game rules are applied to see whether or not at least a three-element match has been created. If it has not, at step S3, the display indicates to a user that the move is invalid, and the player must try again. If a match has been detected, at step S4 an appropriate visual effect is generated for the display to denote the match and the disappearance of the game elements which have been matched. At step S5, new game elements are generated for the display, these game elements falling downwards to fill up the display from the top. The so-called physics of the tile on generation of a new game board after each move is always the same in the existing version of the game called Candy Crush™. That is, tiles drop down from above the game board at a set speed.

One or more avatars may be caused to be displayed on the game board 902 in a manner similar to or the same as that previously described. For example an avatar 960 may be caused to be displayed on the game board 902, as shown in FIG. 12. In this embodiment the tile in question comprises the avatar 960, but no candy. Nevertheless the avatar 960 may still be considered to be associated with a game object, in as much as it is associated with surrounding game objects. In some embodiments, if a match game condition is detected adjacent to the avatar 960, then that avatar may be freed or "unlocked". In other words the avatar may be unlocked in response to a game event involving a game object with which the avatar is associated. This match game condition may be considered a game event. The game event may cause the avatar to be removed from the game board.

Figure 13:
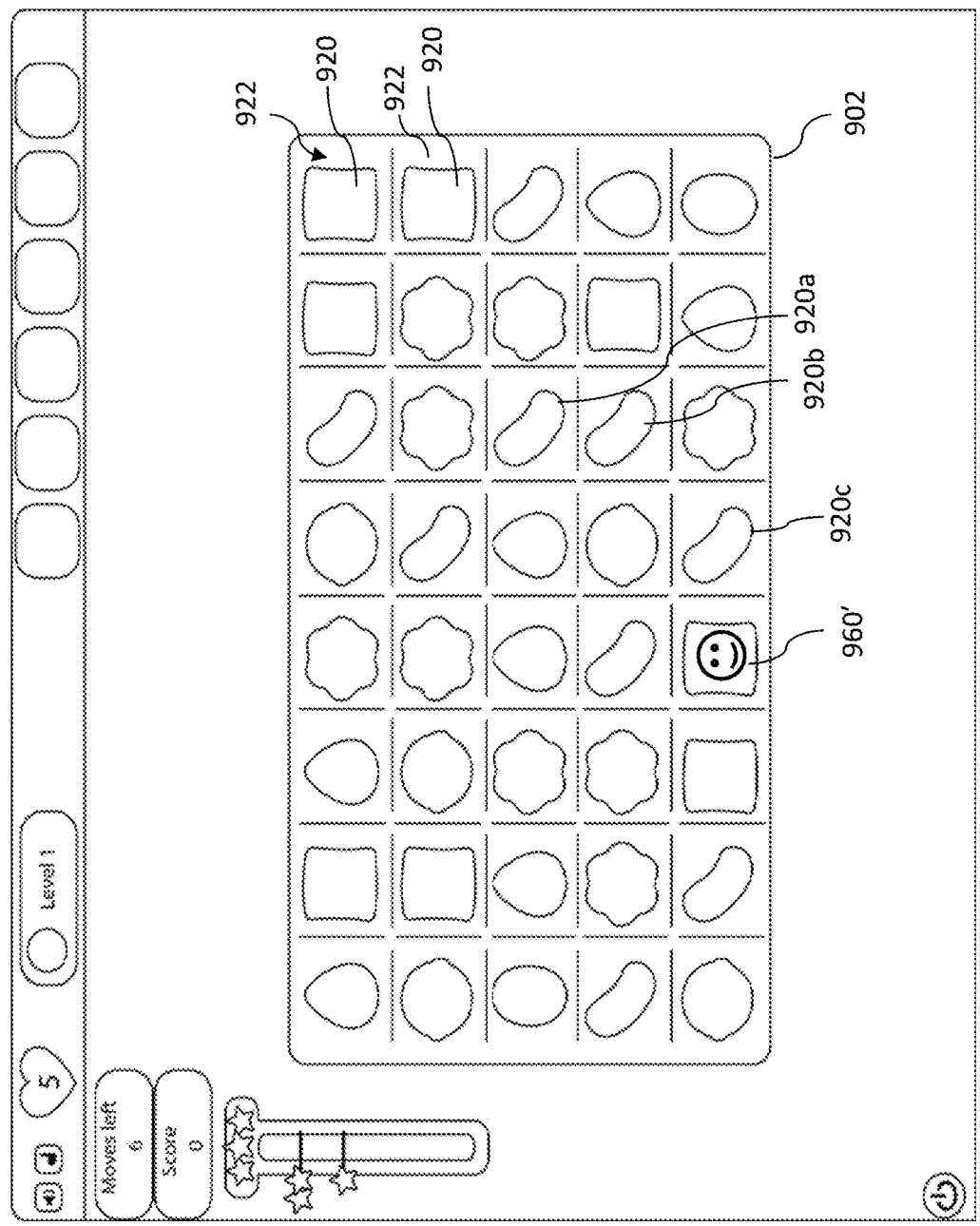
FIG. 13 shows an example game board of a computer-implemented game according to an embodiment.

In the embodiment shown in FIG. 13 an avatar 960' is displayed on a candy. In other words the avatar 960' may be considered to be comprised in a game object, or the avatar 960' may be considered to be on top of or inside a game object. In this embodiment the avatar may be unlocked in response to a matching condition involving the candy within which the avatar is comprised. In other words the avatar may be unlocked in response to a game event involving a game object within which the avatar is comprised.

As per the earlier described embodiments, in response to a game event messaging may be initiated with a user associated with an avatar associated with the game event.

In embodiments communication can be initiated with the user associated with the unlocked avatar (i.e. "second user") at any time after the unlocking has occurred. For example communication may be initiated as soon as the game criteria has been satisfied. That is communication may be initiated with the second user in direct response to the game criteria being satisfied. Therefore in some embodiments it is not a requirement to wait for a game or level to be completed before the message is transmitted to the second user. Alternatively and/or additionally communication may be initiated with the second user upon completion of a game or level.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer-implemented method comprising:
   storing in a memory information relating to a plurality of game objects;
   determining by a processor in communication with the memory one or more of the game objects to be displayed on a game board on a display in a manner enabling a first user to play a game using one or more of the game objects;
   causing by the processor at least one graphical representation associated with a second user to be displayed on the game board, information of the at least one graphical representation being obtained from an electronic database storing information relating to a plurality of user profiles, and a game criteria being associated with the at least one graphical representation of the second user;
   receiving a user input from the first user via a user interface to select at least one of the game objects on the game board;
   in response to the user input to select at least one of the game objects, determining there is a match where a match condition between a plurality of the game objects is satisfied, wherein when it is determined that the match condition is satisfied, at least one or more of the plurality of the game objects is removed from the game board and other game objects are positioned on the game board in place of the removed game objects;
   in response to determining that there is a match, determining whether the match further causes the game criteria associated with the at least one graphical representation of the second user to be satisfied, the game criteria comprising that a given number of events have occurred with respect to the graphical representation of the second user, the given number of events being greater than one; and
   responsive to determining that the game criteria associated with at least one graphical representation of the second user is satisfied, communicating with the second user.

2. The method as claimed in claim 1, wherein each event of the given number of events comprises a match.

3. The method as claimed in claim 1, wherein a match causes at least one other match, each of these matches comprising an event.

4. The method as claimed in claim 1, wherein a match causes at least one other match, and when a respective match satisfies a respective criteria, that respective match comprises an event.

5. The method as claimed in claim 1, wherein a match causes at least one other match, at least one of these matches comprising an event.

6. The method as claimed in claim 1, wherein at least one event of the given number of events is provided by an activation of a booster game object.

7. The method as claimed in claim 1, wherein at least one event of the given number of events is caused in response to an activation of a booster game object.

8. The method of claim 6, wherein the booster game object when activated is configured to remove a line of game objects from the game board.

9. The method as claimed in claim 1, wherein at least one event of the given number of events is at least one match and at least one event of the given number of events is provided by an activation of a booster game object.

10. The method as claimed in claim 1, wherein the game criteria comprises releasing a game object with which the graphical representation of a second user is associated from a locked status in the game.

11. The method as claimed in claim 1, wherein the at least one graphical representation associated with the second user is at least one of the game objects in a match satisfying the match condition and providing a respective one of the events.

12. The method as set forth in claim 1, wherein the match condition indirectly causes an event to occur with respect to the graphical representation of the second user.

13. The method as claimed in claim 1, comprising determining as an event that one of the plurality of game objects in a match satisfying a match condition is located adjacent to a location of the graphical representation of the second user.

14. The method as claimed in claim 1, wherein the communicating comprises transmitting a message to the second user, the method further comprising receiving a message from the second user, to provide two way communication between the first user and the second user.

15. The method as claimed in claim 1, wherein the message comprises link information, and the method comprises enabling the second user to select the link information to view a video of the game.

16. The method as claimed in claim 1, wherein the message is addressed to the second user from the first user.

17. The method as set forth in claim 1, wherein the graphical representation comprises a profile picture of the second user obtained from a social network or an avatar.

18. The method of claim 1, wherein the at least one graphical representation associated with the second user is displayed on the game board in association with a respective game object.

19. A computer readable storage device storing instructions that, when processed by at least one processor of a device, causes the processor to:
   store in a memory information relating to a plurality of game objects;
   determine by the processor in communication with the memory one or more of the game objects to be displayed on a game board on a display in a manner enabling a first user to play a game using one or more of the game objects;
   cause by the processor at least one graphical representation associated with a second user to be displayed on the game board, information of the at least one graphical representation being obtained from an electronic database storing information relating to a plurality of user profiles, and a game criteria being associated with the at least one graphical representation of the second user;

receive a user input from the first user via a user interface to select at least one of the game objects on the game board;

in response to the user input to select at least one of the game objects, determining that there is a match where a match condition between the plurality of game objects is satisfied, wherein when it is determined that the match condition is satisfied, at least one or more of the plurality of the game objects is removed from the game board and other game objects are positioned on the game board in place of the removed game objects;

in response to determining that there is a match, determining whether the match further causes the game criteria associated with the at least one graphical representation of the second user to be satisfied, the game criteria comprising that a given number of events have occurred with respect to the graphical representation of the second user, the given number of events being greater than one; and responsive to determining that the game criteria associated with the at least one graphical representation of the second user is satisfied, communicating with the second user.

20. A device comprising:

at least one memory;

at least one processor in communication with the at least one memory;

the at least one memory storing information relating to a plurality of game objects;

the at least one processor configured to:

determine one or more of the game objects to be displayed on a game board on a display in a manner enabling a first user to play a game using one or more of the game objects;

cause at least one graphical representation associated with a second user to be displayed on the game board, information of the at least one graphical representation being obtained from an electronic database storing information relating to a plurality of user profiles, and a game criteria being associated with the at least one graphical representation of the second user;

receive a user input from the first user via a user interface to select at least one of the game objects on the game board;

in response to the user input to select at least one of the game objects, determine that there is a match where a match condition between the plurality of game objects is satisfied, wherein when it is determined that the match condition is satisfied, at least one or more of the plurality of the game objects is removed from the game board and other game objects are positioned on the game board in place of the removed game objects;

in response to determining that there is a match, determine whether the match further causes the game criteria associated with the at least one graphical representation of the second user to be satisfied, the game criteria comprising that a given number of events have occurred with respect to the graphical representation of the second user, the given number of events being greater than one; and responsive to determining that the game criteria associated with the at least one graphical representation of the second user is satisfied, communicating with the second user.

\* \* \* \* \*